United States Patent
Chao et al.

(10) Patent No.: US 9,413,461 B2
(45) Date of Patent: Aug. 9, 2016

(54) HIGH BANDWIDTH OPTICAL LINKS FOR MICRO-SATELLITE SUPPORT

(71) Applicant: California Institute of Technology, Pasadena, CA (US)

(72) Inventors: Tien-Hsin Chao, Valencia, CA (US); Keith E. Wilson, El Monte, CA (US); Keith Coste, La Crescenta, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 14/532,953

(22) Filed: Nov. 4, 2014

(65) Prior Publication Data

US 2015/0125157 A1      May 7, 2015

Related U.S. Application Data

(60) Provisional application No. 61/899,700, filed on Nov. 4, 2013.

(51) Int. Cl.
*H04B 10/118*      (2013.01)

(52) U.S. Cl.
CPC .................... *H04B 10/118* (2013.01)

(58) Field of Classification Search
CPC ........................................ H04B 10/118
USPC .................. 398/122–123, 129, 131
See application file for complete search history.

(56) References Cited

U.S. PATENT DOCUMENTS

| | | | |
|---|---|---|---|
| 5,062,150 A * | 10/1991 | Swanson | H04B 10/118 250/203.1 |
| 6,091,528 A * | 7/2000 | Kanda | H04B 10/118 398/1 |
| 6,268,944 B1 * | 7/2001 | Szapiel | H04B 10/118 398/129 |
| 8,160,452 B1 * | 4/2012 | Tidwell | H04B 10/118 398/138 |
| 9,086,608 B2 * | 7/2015 | Auld | G02F 1/1334 |
| 2003/0144041 A1 * | 7/2003 | Oettinger | H04B 10/1123 398/131 |
| 2004/0166801 A1 | 8/2004 | Sharon et al. | |
| 2008/0130094 A1 * | 6/2008 | Tang | G02F 1/29 359/315 |

(Continued)

FOREIGN PATENT DOCUMENTS

KR      10-2011-0070669      3/2015

OTHER PUBLICATIONS

"Liquid Crystal Waveguide Technology", Vescent Photonics, Last accessed Oct. 16, 2014. http://www.vescent.com/technology/liquid-crystal-waveguide-technology/.

(Continued)

*Primary Examiner* — Leslie Pascal
(74) *Attorney, Agent, or Firm* — Gates & Cooper LLP

(57) ABSTRACT

A method, systems, apparatus and device enable high bandwidth satellite communications. An onboard tracking detector, installed in a low-earth orbit satellite, detects a position of an incoming optical beam received/transmitted from a first ground station of one or more ground stations. Tracker electronics determine orientation information of the incoming optical beam based on the position. Control electronics receive the orientation information from the tracker electronics, and control a waveguide drive electronics. The waveguide drive electronics control a voltage that is provided to an electro-optic waveguide beam steering device. The electro-optic waveguide beam steering device steers an outgoing optical beam to one of the one or more ground stations based on the voltage.

12 Claims, 5 Drawing Sheets

(56) References Cited

U.S. PATENT DOCUMENTS

2012/0249366 A1 10/2012 Pozgay et al.
2013/0156439 A1 6/2013 Arnold et al.
2013/0210424 A1 8/2013 Boustie et al.

OTHER PUBLICATIONS

"Position Sensing with Photodiodes", Laser Components, Advanced Photonics, Inc., Last accessed Mar. 9, 2015. http://www.google.com/url?sa=t&rct=j&q=&esrc=s&source=web&cd=1&ved=0CB4QFjAA&url=http%3A%2F%2Fwww.lasercomponents.com%2Ffileadmin%2Fuser_upload%2Fhome%2FDatasheets%2Flc%2Fapplikationsreport%2Fposition-sensing.pdf&ei=zuj9VK_FOcLvoATWzIGgDA&usg=AFQjCNHBholcSwTCqzFliC8eU3bBi69xiA&sig2=2_MbzCCV0HSqjbFMb.

Toyoda, M., et al., "Measurement of the Characteristics of a Quadrant Avalanche Photodiode and its Application to a Laser Tracking System", Opt. Eng. 41(1) 145-149 (Jan. 2002).

International Search Report and Written Opinion dated Jan. 28, 2015 for PCT Application No. PCT/US2014/063947.

* cited by examiner

HIGH BANDWIDTH OPTICAL LINKS FOR MICRO-SATELLITE SUPPORT

CROSS-REFERENCE TO RELATED APPLICATIONS

This application claims the benefit under 35 U.S.C. Section 119(e) of the following commonly-assigned U.S. provisional patent application(s), which is/are incorporated by reference herein:

Provisional Application Ser. No. 61/899,700, filed on Nov. 4, 2013, by Tien-Hsin Chao, Keith E. Wilson, and Keith Coste, entitled "High Bandwidth Optical Links for Micro-Satellite Support".

STATEMENT REGARDING FEDERALLY SPONSORED RESEARCH AND DEVELOPMENT

The invention described herein was made in the performance of work under a NASA Contract, and is subject to the provisions of Public Law 96-517 (35 USC 202) in which the Contractor has elected to retain title.

BACKGROUND OF THE INVENTION

1. Field of the Invention

The present invention relates generally to satellite based communications, and in particular, to a method, apparatus, and article of manufacture for conducting high bandwidth optical communication between a satellite and a ground station.

2. Description of the Related Art

Low earth orbit (LEO) satellites are commonly used for a variety of tasks including earth observation, spy satellites, conducting experiments (e.g. on the International Space Station), etc. Ground-to-space communication with such satellites is crucial. High-speed free-space optical (FSO) laser communications have been used for ground-to-space links. Optical wireless free space communications involving moving parties (e.g., satellites), especially at extra-long distances, require precise beam pointing and tracking.

To transmit data to a satellite, ground stations commonly transmit an optical beam to a satellite (whose location may be known based on ephemeris data). To transmit data from the satellite to the ground station, the satellite steers an optical beam down to the ground station using opto-mechanical methods (e.g., a gimbal). However, beam steering using diffractive elements including liquid crystal (LC) arrays, MEMs (micro-electro-mechanical) arrays, electro-wetting arrays, or any other grating elements suffer many drawbacks. For example, the grating efficiency drops as the scan angle increases which inherently limits all of the above approaches to small angle scanners and therefore necessitates complicated multi-stage designs. Further, the above approaches do not realize sufficient control over light. In this regard, the above approaches are inherently mechanical and therefore impose vibration and inertia design challenges, while also providing only limited control over optical phase. In view of the above, what is needed is a method for establishing satellite-to-ground communications that do not rely on opto-mechanical methods and eliminate the drawbacks set forth above.

SUMMARY OF THE INVENTION

Embodiments of the invention overcome the problems of the prior art. Onboard systems of an LEO satellite, are able to detect and determine the position/orientation of an uplink beam transmitted from a ground station. Such a ground station may be at a fixed location on Earth or may be a moving vehicle (e.g., a plane and/or other satellite). The position/orientation information are used to control a voltage that is applied to an electro-optic waveguide beam steering device. The voltage alters the properties/attributes of a liquid crystal cladding of the waveguide beam steering device in a determinable manner. Such an alteration of the properties of the cladding (i.e., the index of refraction of the cladding), enables an outgoing laser beam to be steered in a discernable direction (i.e., based on the voltage applied). Accordingly, based on the orientation/position of an incoming uplink beam, the system utilizes a waveguide beam steering device to steer an outgoing downlink beam (that originates from a source within the LEO satellite and is different from the incoming beam) in a completely non-mechanical manner.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

System Overview

Figure 1:
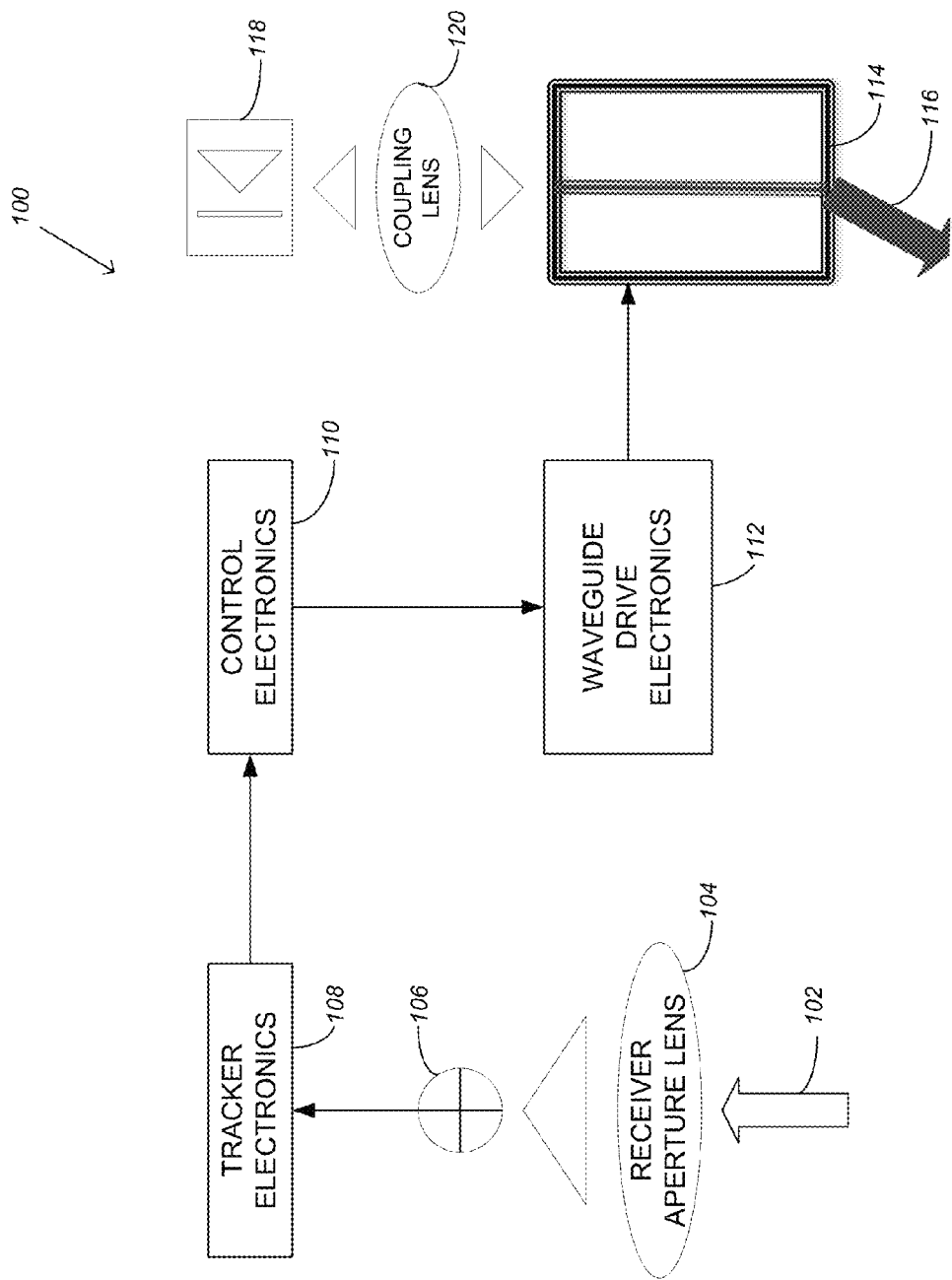
FIG. 1 illustrates a high-bandwidth satellite downlink communication system in accordance with one or more embodiments of the invention.

To overcome the problems of the prior art, embodiments of the invention provide and control a beam steering device that utilizes waveguide technology (e.g., liquid crystal waveguide technology). FIG. 1 illustrates a high-bandwidth satellite downlink communication system 100 in accordance with one or more embodiments of the invention. System 100 is installed onboard a satellite (e.g., Cubesat™ satellite). An incoming optical beam 102 (e.g., a 976 nm beacon laser) is received into system 100. Such an incoming optical beam 102 is transmitted from a ground station (e.g., via telescope that is transmitting a broad laser beam up to the satellite) (i.e., from a first ground station of one or more ground stations). The ground station may utilize radar tracking to identify the (rough) location of the LEO satellite (e.g., using ephemeris data).

Receiver aperture lens 104 focuses the incoming optical beam 102 onto the tracking detector 106. The onboard tracking detector 106 receives the focused incoming optical beam. Tracker electronics 108 and the detector 106 are utilized to determine/detect a position/orientation of the incoming optical beam 102. The detector 106 may consist of a quadrant avalanche photodiode tracking detector and/or other very sensitive high speed detector. A typical on board tracking detector 106 is one with high responsivity and low noise equivalent power (NEP). A point design detector for a 1060 nm uplink beacon 102 is a P-type silicon PIN quadrant photodiode tracker with 0.45 A/W responsivity, <7E-11 W/Hz NEP and 80 sqmm active area. InGaAs quadrant detectors with appropriate performance would be used for a 1500 nm uplink beacon 102. By detecting of the position/orientation of the incoming optical beam 102, the detector 106 and tracker electronics 108 can track where the laser beam 102 is coming from (i.e., the location of the ground station transmitting the incoming optical beam 102).

The tracker electronics 108 provide the position/orientation information to the control electronics 110. The control electronics 110 control the waveguide drive electronics 112 that drives the electro-optic waveguide beam steering device 114 that steers the outgoing optical beam 116 to a ground station (e.g., one of the one or more ground stations). In this regard, the waveguide drive electronics 112 provide different voltages to the electro-optic waveguide beam steering device to steer the beam 116 to the correct location. The outgoing beam 116 originates from an on-board light beam source such as a modulated 808 nm diode 118. One or more coupling lenses 120 form/focus the beam from light beam source 118 onto the waveguide 114 (which steers the beam 116 to the desired ground station(s)).

Thus, the control 110 and tracker electronics 108 registers the location of the uplink beacon 102 and downlink beams on the quadrant detector 106 and provides feedback to the waveguide electronics 112 to steer the downlink beam 116 pointing to the position of the ground station. The waveguide electronics 112 receives its input from the control electronics 110 and applies the appropriate amplification of the voltage applied to the waveguide 114 to achieve the desired downlink beam 116 deflection. Beam steering of +/−12 degrees has been demonstrated in the lab for an applied voltage of +/−4 volts. In a typical application the track excursion would be +/−45 degrees corresponding voltages of less than +/−20V.

Of particular note is that the satellite is moving at approximately 17,000 mph. The average angular rate of a LEO satellite relative to the ground station is less than 1 degree/second. Accordingly, the tracker electronics 108, control electronics 110, and waveguide drive electronics 112 would need to operate at speeds of 60 Hz in order to adjust the beam steering angle so that it remains locked onto the desired ground station. Further, due to the accuracy and speed required for directing the outgoing light beam 116, embodiments of the invention rely on the electro-optic waveguide beam steering device 114 instead of a mechanical mount such as a gimbal device.

Free Space Optical (FSO) Communications

Figure 2:
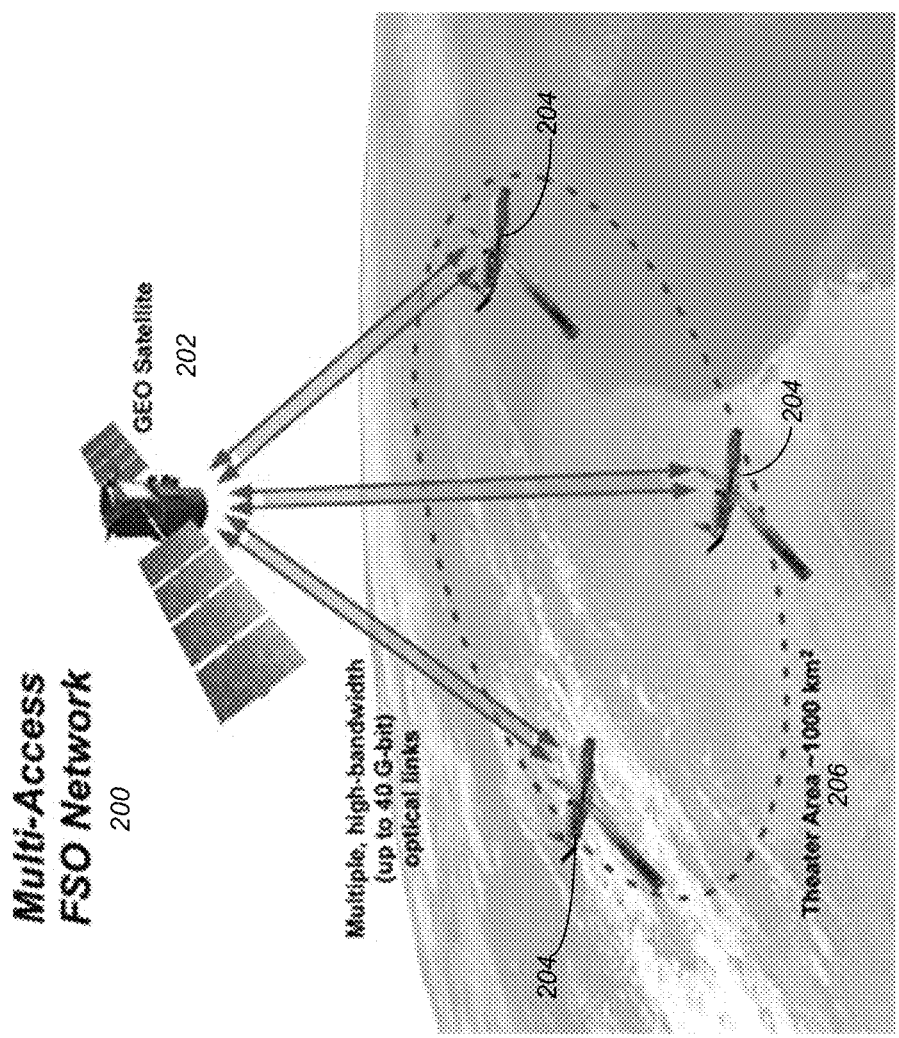
FIG. 2 illustrates an exemplary multi-access FSO network that utilizes an electro-optic waveguide beam steering device in accordance with one or more embodiments of the invention.

In additional embodiments of the invention, free space optical (FSO) communications may be enabled using an electro-optic waveguide beam steering device 114 described herein. FIG. 2 illustrates an exemplary multi-access FSO network 200 that utilizes such a device 114 in accordance with one or more embodiments of the invention. A geosynchronous (GEO) satellite 202 emits multiple high-bandwidth (up to 40 G-bit) optical links (e.g., utilizing device 114) to communicate with moving vehicles (e.g., airplanes 204) within a theater area 206 (e.g., of 1000 km$^2$). The electro-optic waveguide beam steering device 114 may be used both within the satellite 202 and/or the moving vehicles 204.

Use of the electro-optic waveguide beam steering device 114 provides unprecedented cost, Size, Weight, and Power (SWaP) efficiencies/benefits, thereby enabling multi-access FSO deployment on previously inaccessible platforms.

Electro-Optic Waveguide Beam Steering Device

The electro-optic waveguide beam steering device 114 utilizes electro-optic attributes/capabilities to steer an outgoing optical beam 116 to a desired location. Such a device 114 may also be referred to as a non-mechanical 2D (two dimensional) electro-optic (EO) beam scanner. As described above, prior art beam steering have many drawbacks/disadvantages. Embodiments of the invention utilize refractive elements of an electro-optic waveguide beam steering device 114, wherein a dramatically large electro-optic effect enables Snell's law refractive scanning. Further, use of such electro-optic waveguide beam steering device 114 enables 2D wide-angle beam scanning in a manner that is completely non-mechanical. One exemplary electro-optic waveguide beam steering device 114 is the LC waveguide based electro-optical beam scanner available from Vescent Photonics Inc.™.

Figure 3A:
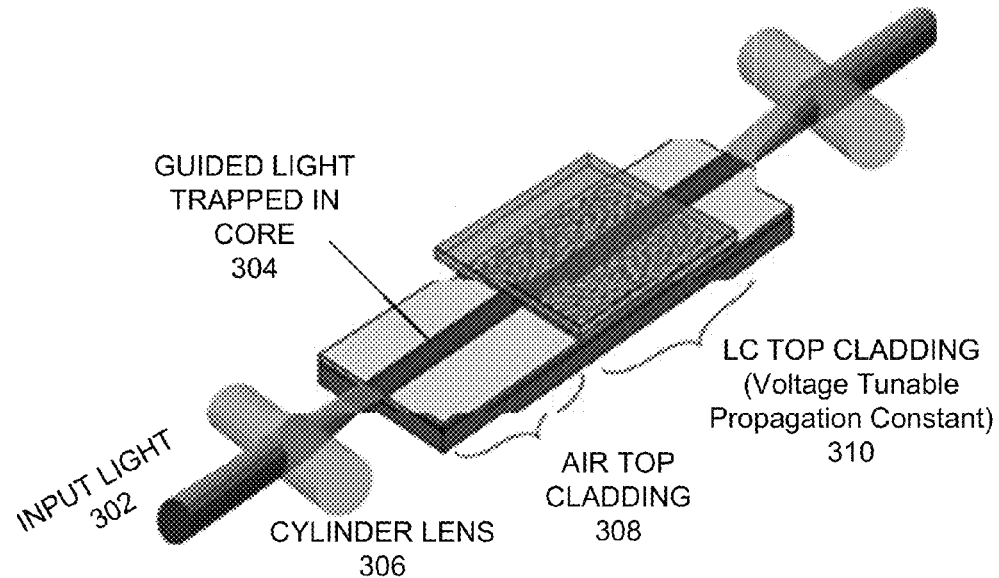
FIG. 3A illustrates a 3D view and FIG. 3B illustrates a side view of a liquid crystal (LC) waveguide of an exemplary LC waveguide that may be utilized in accordance with one or more embodiments of the invention.
Figure 3B:
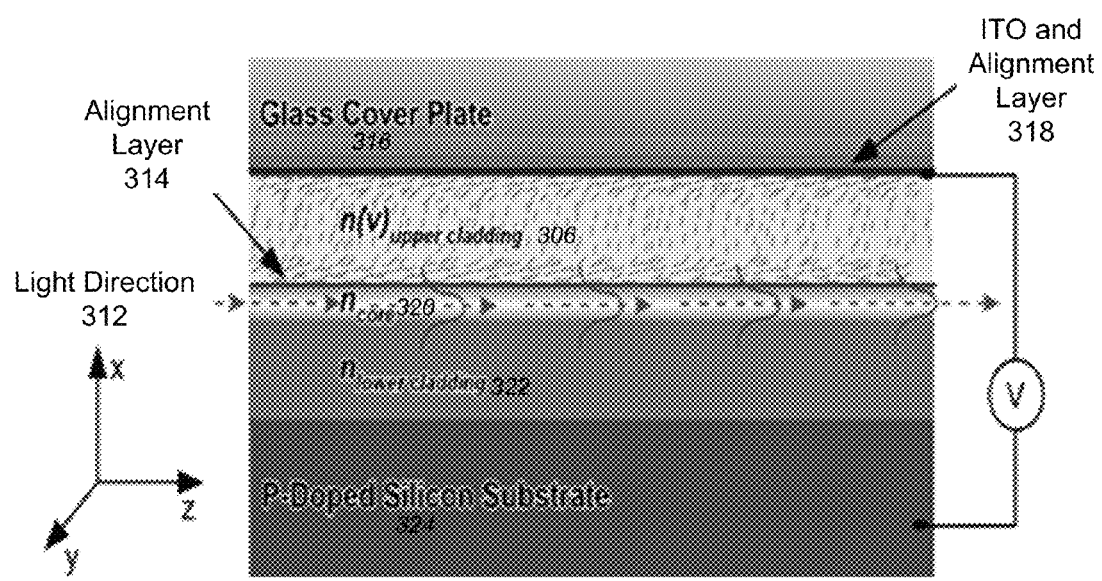

FIG. 3A illustrates a 3D view and FIG. 3B illustrates a side view of a liquid crystal (LC) waveguide of an exemplary LC waveguide that may be utilized in accordance with one or more embodiments of the invention. The basic geometry of an LC waveguide consists of input light 302 that is focused/confined to a core 304 using cylinder lens 306. The LC consists of air top cladding 308 and an electro-optic upper cladding 310 (i.e., having a voltage tunable propagation constant). As the index of refraction of the upper cladding 310 is tuned (e.g., by applying a desired voltage), the "effective index" of the guided mode is also tuned.

Referring to FIG. 3B, in a slab waveguide, the light 302 is guided in the x dimension 312, but is free to propagate as Guassian beams, sheets, or even 1D images in the yz plane. Further, rather than transmitting through an LC cell, which by design must be thin, the LC waveguide utilizes the LC as an active cladding layer 310 in a waveguide architecture (i.e., the light 302 skims along the surface of the LC alignment layer 314). Accordingly, unlike traditional LC, the light 302 never crosses a transparent electrode, the light only interacts with the well-behaved LC surface layer via an evanescent field, and the interaction length is decoupled from the LC-layer thickness. As further illustrated, a glass cover plate 316 is on top of the ITO (indium-tin oxide)/electrode and LC alignment layer 318. The light 302 is confined to the core 320 between the upper cladding 306 and lower cladding 322 which is grown on a p-doped silicon substrate 324. Thus, the voltage may be applied via the electrode/ITO alignment layer 318 and tuning the index of refraction of the upper cladding 306.

Figure 4:
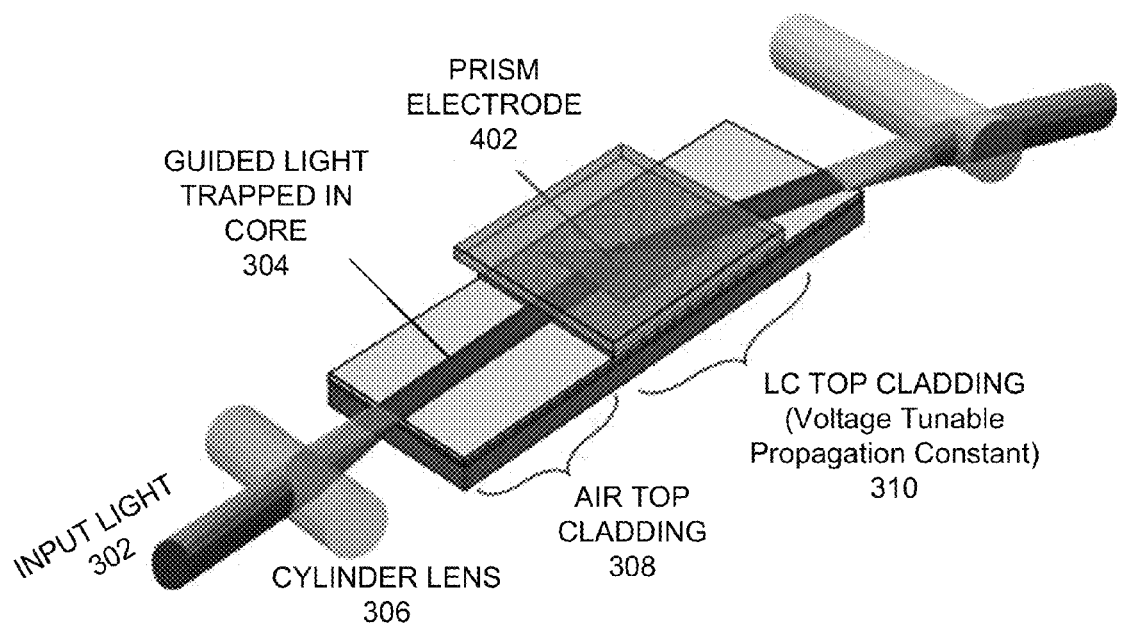
FIG. 4 illustrates an exemplary 1D LC-waveguide beam steerer that may be utilized in accordance with one or more embodiments of the invention.

FIG. 4 illustrates an exemplary 1D LC-waveguide beam steerer that may be utilized in accordance with one or more embodiments of the invention. The configuration is similar to the beam steerer of FIG. 3A but for the use of a prism-shaped electrode 402. A control voltage is applied to the prism-shaped electrode 402 having a non-normal interface to the beam propagation direction. As voltage is applied, the index under the patterned electrode 402 is changed relative to the surrounding area and the outgoing beam is steered via Snell's law refraction.

In embodiments of the invention, custom shaped electrodes/waveguides may be used to steer a beam up to 180 degrees. For example, a 1-cm wide beam may be steered over 50 degrees using racetrack shaped electrodes. Similarly, a curved "Ulrich" out-coupler may be used in combination with race-track shaped electrodes to steer a 1-cm wide beam up to 180 degrees. Out-of-plane steering (e.g., extending steering from 1D to 2D) may be conducted by adding such an "Ulrich" typed beam coupler. Referring to FIG. 3B, the use of such an "Ulrich" coupler causes the light propagating in the core 320 to "leak" out from the region of thinned lower cladding 322 into the silicon substrate 324. Refraction at the silicon interface (i.e., between the lower cladding 322 and the substrate 324) can yield a 1 cm beam and may double the steering angle. In addition, full 2D electro-optical steering may be provided using a 3-electrode device that takes a collimated input beam and provides a voltage steerable collimated output beam.

In view of the above, waveguide based EO scanner capabilities may include wide angle EO scanning of 1 cm aperture in a very compact (e.g., ~2 cm$^3$) and low power (μWs), and simple (3-control electrodes) package, a 7 cm long optic head, steering a 1 cm beam by 90°×60°, and a beam steering angular resolution of <1 mrad. Further capabilities may include very large scan angles (180°×60°), large diameter beams up to 10's of centimeters, beam resolution that can be increased 100× to 10 μrad, multiple channels emitting from a single chip for multi-access, and extremely high bandwidths (e.g., up to T-bits).

Ground-to-Space Communications

As described above, embodiments of the invention utilize an electro-optic waveguide beam steering device to steer an outgoing beam onboard a satellite to a ground station. Similarly, such an electro-optic waveguide beam steering device may be used in a ground station to steer a beam to a satellite or other moving vehicle. Further yet, the electro-optic waveguide beam steering device may be utilized to enable communication between a satellite and any moving vehicle. A satellite may be tracked from ephemeris data/file in order to determine where to steer a beam from the ground to the satellite. The satellite passes selected for transmission may be based on stored data volume, the Sun-Earth probe angle, and the maximum elevation from the ground site. A 1064 nm uplink beacon may be used to initiate a link (between the ground station and the satellite) when the satellite is above the horizon.

Referring back to FIG. 1, an LEO satellite may detect the beacon 102 in a wide field. High precision uplink tracking may be performed using a narrow-field quadrant detector 106. The different electronics 108-112 may then initiate an 808 nm beam 118 downlink (e.g., via the electro-optic waveguide beam steering device 114). The satellite tracking may end when the downlink file is empty.

Figure 5:
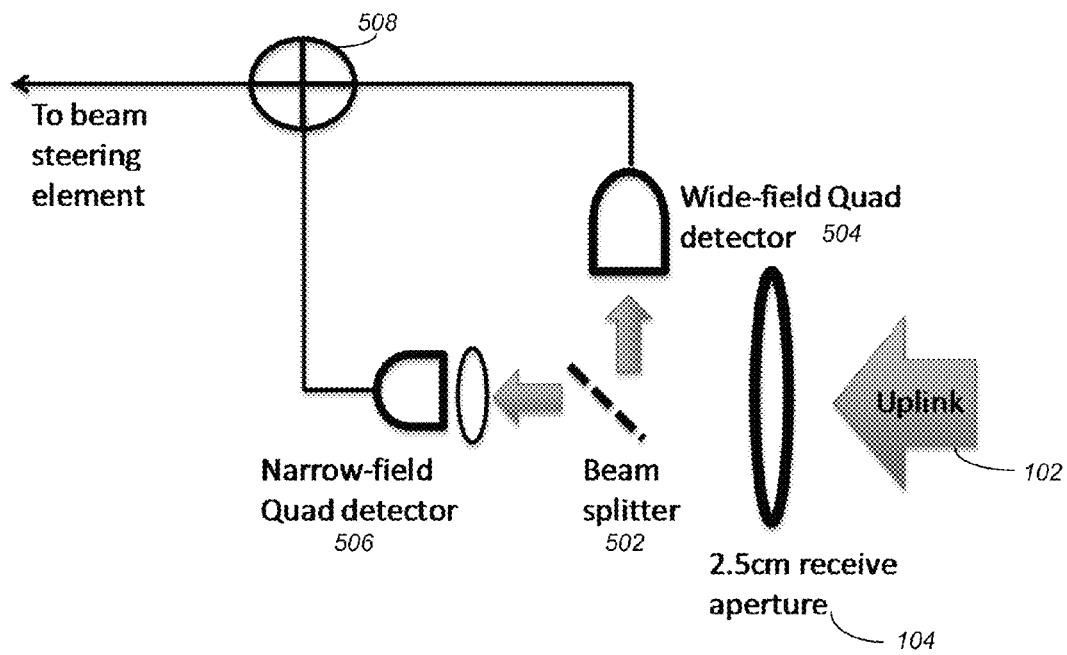
FIG. 5 illustrates an exemplary receiver that may be used for downlink tracking and pointing in accordance with one or more embodiments of the invention.

FIG. 5 illustrates an exemplary receiver that may be used for downlink tracking and pointing in accordance with one or more embodiments of the invention. In other words, FIG. 5 illustrates further details of components 102-106 of FIG. 1. The uplink or incoming beam 102 is received in an aperture lens 104 (e.g., a 2.5 cm aperture lens) that focuses the uplink beam 102 onto the detector 106.

The uplink beam 102 is split via beam splitter 502 and directed to a wide-field quad detector 504 (for lower resolution) as well as a narrow-field quad detector 506 (high resolution) and then directly summed 508 (e.g., as part of a position sensing photodiodes such as a quadrant avalanche photodiode tracking detector (APD)). With a quad detector, the wide and narrow field quad detectors 504-506 are used together to determine the position of a centroid of the uplink beam 102 by comparing the signals from four quadrants. Thereafter, the resulting information (e.g., position and orientation) is forwarding to the beam steering elements (e.g., which is controlled via tracker electronics 108, control electronics 110, and waveguide drive electronics 112 of FIG. 1).

Using the above described configurations, optical communications can enable high multi-Mb/s bandwidth links from power-constrained LEO satellites. For example, a 40 Mb/s link may be achieved with 100 mW transmitted power into a 20 cm ground receiver. Further, a 10 W multi-beam uplink beacon in a 0.5 mrad beam may provide sufficient power in a 2.5 cm satellite aperture lens to support micro-radian pointing of a downlink beam. Accordingly, the beacon serves as a tracking reference for the satellite to point its downlink to the ground station. The multi-beam (uplinks from typically four lasers) beacon mitigates the effects of atmospheric turbulence on the uplink beam presenting an unscintillated tracking reference for the satellite.

Logical Flow

Figure 6:
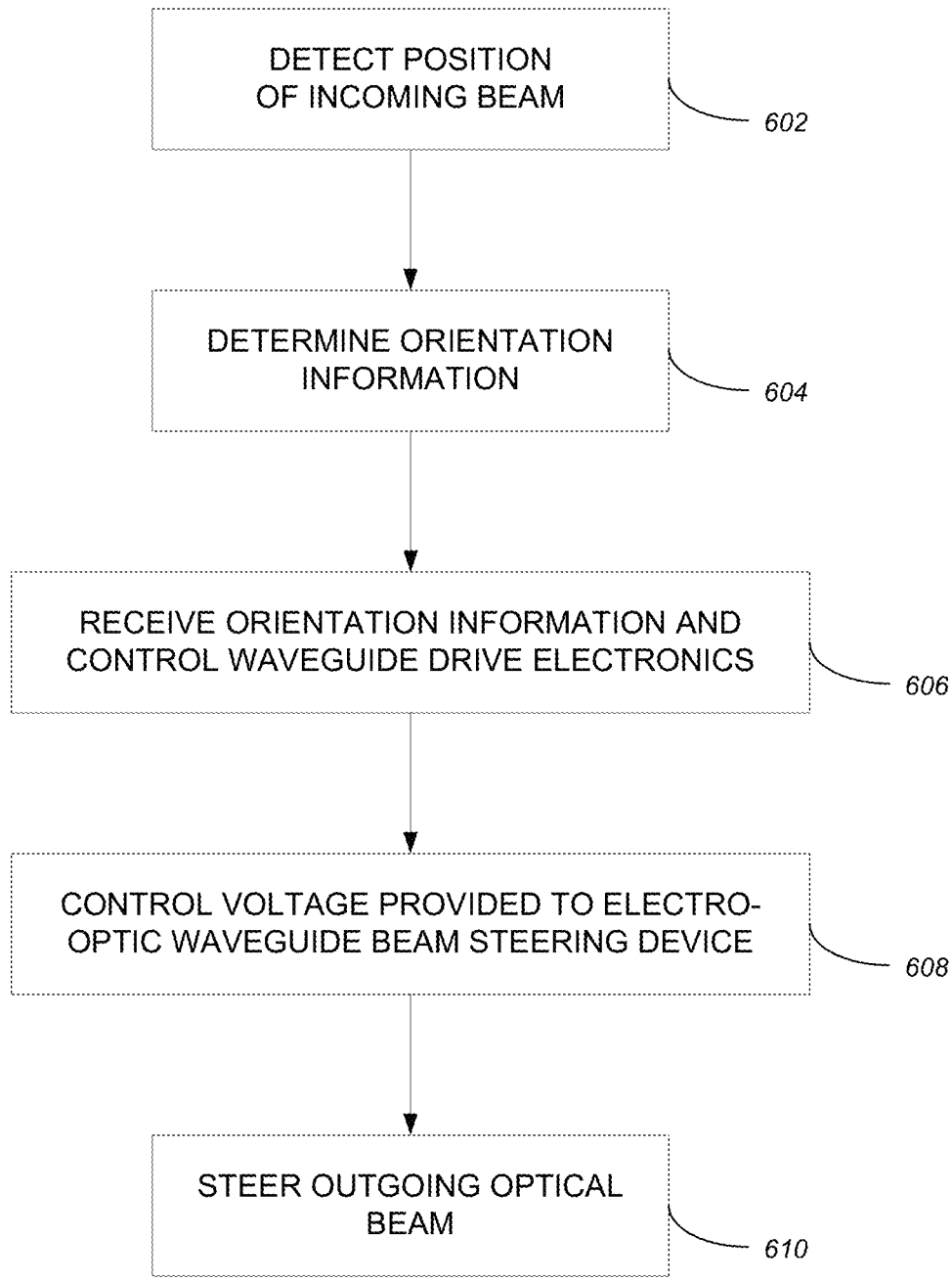
FIG. 6 illustrates the logical flow for steering an optical beam on a LEO satellite in accordance with one or more embodiments of the invention.

FIG. 6 illustrates the logical flow for steering an optical beam on a LEO satellite in accordance with one or more embodiments of the invention.

At step 602, the position of an incoming (uplink) optical beam received (on the LEO satellite) from a first of one or more ground stations is detected. Such detection may be performed by a quadrant avalanche photodiode tracking detector. Further, the incoming optical beam may be received via a receiver aperture lens that focuses the incoming optical beam onto the tracking detector.

At step 604, orientation information of the incoming optical beam is determined (based on the position).

At step 606, the orientation information is received and used to control waveguide electronics.

At step 608, the wave guide electronics are used to control a voltage that is applied/provided to an electro-optic waveguide beam steering device.

At step 610, the electro-optic waveguide beam steering device steers an outgoing (downlink) optic beam to one or more ground stations based on the voltage. To steer the beam, the voltage may be applied to an electrode having an interface to a beam propagation direction. When the voltage is applied, an index under the electrode is changed relative to a surrounding area and the outgoing optical beam is steered via Snell's law refraction. In other words, the electro-optic waveguide beam steering device utilizes a voltage to alter the properties of a liquid crystal cladding, thereby causing a light beam to refract in a discernable direction that has a known (e.g., a proportional) relationship to the voltage. Further, the outgoing optical beam may be continuously steered and locked onto one or more ground stations (i.e., to maintain optical communications while the LEO satellite is orbiting/travelling at approximately 17,000 mph). Of note is that the outgoing downlink optical beam is not merely a reflective beam or a transponder beam based on the incoming uplink beam. Instead, a separate optical beam source (i.e., separate from the ground-based beam source of the uplink beam) is utilized and is steered in a discernable and desired location via the voltage applied to the waveguide beam steering device.

CONCLUSION

This concludes the description of the preferred embodiment of the invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A high bandwidth satellite downlink communication system comprising:
   an onboard tracking detector, installed in a satellite, that detects a position of an incoming optical beam from a first ground station of one or more ground stations;
   tracker electronics that determines orientation information of the incoming optical beam based on the position;
   control electronics that receive the orientation information from the tracker electronics, and control a waveguide drive electronics based on the orientation information;
   the waveguide drive electronics that controls a voltage provided to an electro-optic waveguide beam steering device; and
   the electro-optic waveguide beam steering device that steers an outgoing optical beam from the satellite to one of the one or more ground stations based on the voltage, wherein the electro-optic waveguide beam steering device steers the outgoing optical beam by applying the voltage to an electrode having an interface to a beam propagation direction, and wherein as voltage is applied, an index under the electrode is changed relative to a surrounding area and the outgoing optical beam is steered via Snell's law refraction.

2. The system of claim 1, wherein the tracking detector comprises an on quadrant avalanche photodiode tracking detector.

3. The system of claim 1, further comprising a receiver aperture lens that focuses the incoming optical beam onto the tracking detector.

4. The system of claim 1, wherein the electro-optic waveguide beam steering device provides 2-axis control over a field of view.

5. The system of claim 1, wherein the outgoing optical beam is continuously steered and locked onto the one of the one or more ground stations.

6. The system of claim 1, wherein the electro-optic waveguide beam steering device further enables free space optical (FSO) communications by steering the outgoing optical beam to one or more moving vehicles within a theater area.

7. A method for steering an optical beam on a satellite comprising:
   detecting, on a satellite, a position of an incoming optical beam from a first ground station of one or more ground stations;
   determining orientation information of the incoming optical beam based on the position;
   receiving the orientation information and controlling a waveguide drive electronics based on the orientation information;
   controlling, via the waveguide drive electronics, a voltage that is provided to an electro-optic waveguide beam steering device; and
   steering, via the electro-optic waveguide beam steering device, an outgoing optical beam from the satellite to one of the one or more ground stations based on the voltage, wherein the steering comprises applying the voltage to an electrode having an interface to a beam propagation direction, and wherein as voltage is applied, an index under the electrode is changed relative to a surrounding area and the outgoing optical beam is steered via Snell's law refraction.

8. The method of claim 7, wherein the detecting is performed by a quadrant avalanche photodiode tracking detector.

9. The method of claim 7, further comprising focusing, via a receiver aperture lens, the incoming optical beam onto the tracking detector.

10. The method of claim 7, wherein the electro-optic waveguide beam steering device provides 2-axis control over a field of view.

11. The method of claim 7, further comprising continuously steered and locking the outgoing optical beam onto the one of the one or more ground stations.

12. The method of claim 7, further comprising the electro-optic waveguide beam steering device enabling free space optical (FSO) communications by steering the outgoing optical beam to one or more moving vehicles within a theater area.

* * * * *